United States Patent [19]

Nakagoshi et al.

[11] Patent Number: 5,243,479
[45] Date of Patent: Sep. 7, 1993

[54] MOUNTING STRUCTURE FOR INFORMATION RECORDING AND REPRODUCING APPARATUS

[75] Inventors: Kazuo Nakagoshi, Odawara; Akira Chuma, Kanagawa; Kazuhisa Shiraishi; Masafumi Nozawa, both of Odawara; Yoshihiro Moribe; Hideo Maekawa, both of Chigasaki, all of Japan

[73] Assignee: Hitachi Ltd., Tokyo, Japan

[21] Appl. No.: 666,484

[22] Filed: Mar. 6, 1991

Related U.S. Application Data

[63] Continuation of Ser. No. 110,819, Oct. 21, 1987, abandoned.

[30] Foreign Application Priority Data

Oct. 22, 1986 [JP] Japan .................................. 61-249608

[51] Int. Cl.⁵ .............................................. G11B 5/012
[52] U.S. Cl. ........................... 360/98.01; 360/97.03; 360/73.03; 360/77.02
[58] Field of Search ............... 360/137, 105, 106, 135, 360/86, 73.03, 75, 77.02, 78.04, 97.01, 97.02, 97.03, 98.01, 98.02

[56] References Cited

U.S. PATENT DOCUMENTS

| | | | |
|---|---|---|---|
| 4,068,267 | 1/1978 | Inouye | 360/98 X |
| 4,317,146 | 2/1982 | Gervais | 360/97.03 |
| 4,367,502 | 1/1983 | Iftikar et al. | 360/97.03 X |
| 4,367,503 | 1/1983 | Treseder | 360/137 X |
| 4,535,373 | 8/1985 | Schuh | 360/97 |
| 4,553,183 | 11/1985 | Brown et al. | 360/97 X |
| 4,568,988 | 2/1986 | McGinlay et al. | 360/77 |
| 4,672,487 | 6/1987 | Brand et al. | 360/97 |
| 4,685,303 | 8/1987 | Branc et al. | 360/69 X |
| 4,698,709 | 10/1987 | Ihlenburg et al. | 360/105 X |
| 4,712,146 | 12/1987 | Moon et al. | 360/97 |
| 4,713,714 | 12/1987 | Gatti et al. | 360/137 |
| 4,739,427 | 4/1988 | Kilmer et al. | 360/97 |

FOREIGN PATENT DOCUMENTS 0005490  1/1985  Japan ............................ 360/137

*Primary Examiner*—Andrew L. Sniezek
*Attorney, Agent, or Firm*—Pennie & Edmonds

[57] ABSTRACT

A housing for an information recording and reproducing apparatus is adapted for increased storage capacity and an increased operating speed by placing a relatively larger number of relatively smaller magnetic disks each having a relatively smaller mass and a relatively smaller recording and reproducing surface in an enclosure and housing the enclosure for a relatively larger magnetic disc in a box-like frame. A shock absorbing device is disposed between the enclosure and the box-like frame to absorb shock. A circuit assembly for controlling the operation of recording and reproducing is disposed outside the enclosure and between the frame and the enclosure.

5 Claims, 4 Drawing Sheets

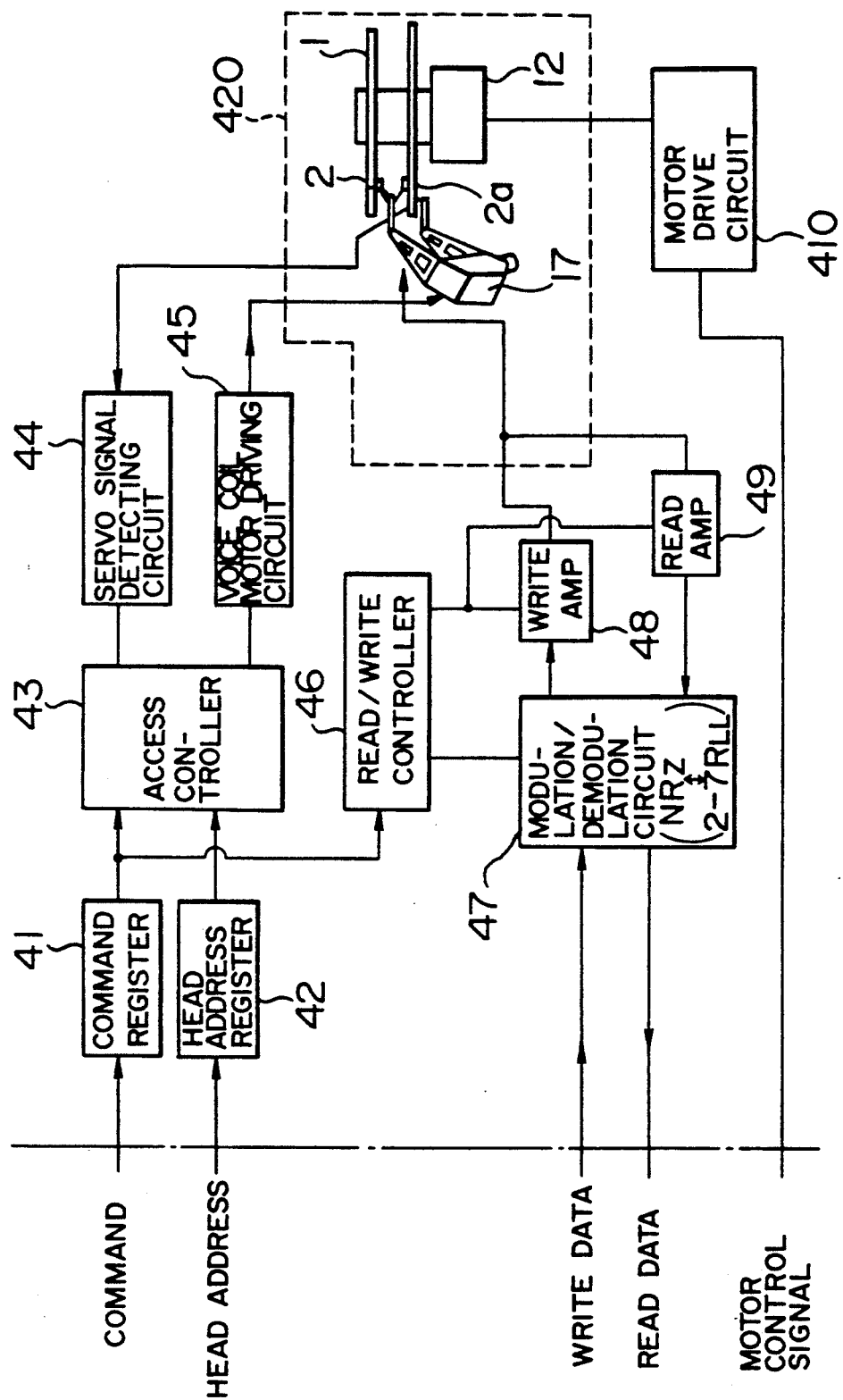

MOUNTING STRUCTURE FOR INFORMATION RECORDING AND REPRODUCING APPARATUS

This is a continuation of application Ser. No. 07/110,819, filed Oct. 21, 1987 now abandoned.

BACKGROUND OF THE INVENTION

The present invention relates to an information recording and reproducing apparatus, and in particular, to an information recording and reproducing apparatus which has a magnetic disk and is capable of effecting a high-speed transfer of information.

As a result of development of computer systems, the information recording and reproducing apparatus such as a magnetic disk device has recently come to possess a large storage capacity and a high transfer speed. Magnetic disk devices with a 5.25-inch disk and with a 3.5-inch disk are respectively put to use as an external storage device of a desk-top apparatus such as a personal computer and as an external storage device of a portable apparatus such as a portable computer. Unlike the magnetic disk device used in a large-sized, general-purpose computer system, the magnetic disk device of a small-sized computer system is substantially contained in a housing, namely, comprises a head disk assembly (generally called HDA) including a structure in which a rotating disk, a magnetic head, and a head positioning mechanism are integrally arranged and a peripheral circuit thereof. Consequently, the magnetic disk devices are classified depending on the outer diameter of used disk as an 8-inch, a 5¼-inch, or a 3.5-inch disk device. For each of such disk drive units, a side of the housing thereof is obtained by adding about 10 mm to the outer diameter of the respective disk.

In addition, the storage capacity of the magnetic disk drive has been increasing and the period of time (the average access time) required to position the magnetic head to read data therefrom has been reduced as the storage capacity is increased. For example, in an 8-inch disk drive, an access time is 18 ms to 23 ms for a storage capacity ranging from 170 megabytes to 600 megabytes; in a 5¼-inch disk drive, an access time is 85 ms to 20 ms for a storage capacity ranging from 20 megabytes to 380 megabytes; and in a 3.5-inch disk drive, an access time is 85 ms to 40 ms for a storage capacity ranging from 10 megabytes to 40 megabytes.

However, since the rotational speed of the disk is substantially 3600 rotations per minute (rpm), about 8.3 milliseconds are required as the average latency time.

Incidentally, a period of time required, on average, to read information from a magnetic disk is determined by a sum of the average access time and the average latency time. In the prior art, the average access time which takes a longer period of time as compared with the average latency time is reduced to minimize the average access time. In order to reduce the average access time, there have been adopted a method to decrease the weight of the magnetic head arm which is a movable mass, a method to increase the driving force by use of a large-sized voice coil motor, and a structure in which a plurality of magnetic heads are disposed over a surface of a magnetic disk so as to reduce the movable stroke of the disk and to divide the loads between the inner side and the outer side of the disk. However, the method to decrease the average access time has become increasingly difficult in a technological sense, and the degree of the reduction of the average access time is less than that of the increase of the storage capacity of the magnetic disk device, which as a result prevents the system performance from being improved in a system using the magnetic disk device.

U.S. Pat. No. 4,568,988 describes a 3.5-inch magnetic disk device, which is related to the devices described above.

In the prior-art technology, however, considerations have not been given to a reduction of the period of time required to read information written in a magnetic disk or to write information in a magnetic disk device in a comprehensive sense, which leads to a problem that a long period of time is necessary to record or to reproduce information.

SUMMARY OF THE INVENTION

It is therefore an object of the present invention to effect high-speed information recording and reproducing operations in an information recording and reproducing apparatus, for example, a magnetic disk device so as to improve the performance of the overall computer system using the magnetic disk device.

Another object of the present invention is to provide an information recording and reproducing apparatus which is capable of recording and reproducing information at a high speed.

According to an aspect of the present invention, when the rotational speed of the disk is increased, the average latency time is reduced, and as a result, the recording and reproducing time can be minimized.

According to an embodiment of the present invention, a disk on which information is to be recorded is rotated at a high speed by means of a motor mounted on a spindle supported on the ends thereof by bearings and directly linked to a shaft of the disk. This causes the swing and vibration of the disk to be reduced; consequently, a stable rotation is achieved at a high speed. Furthermore, since the diameter of the disk is smaller than the corresponding dimension of the apparatus, the wind loss at a high-speed rotation is minimized and hence the power consumption can be reduced. Moreover, as for an operation to move an arm having a magnetic head to record and to reproduce information on a disk in a radial direction of the disk, since the distance of the radial movement can be minimized due to the small diameter of the disk and the movable mass can also be reduced, the magnetic head is enabled to be moved with respect to the disk at a high speed by use of a large-sized voice coil motor.

BRIEF DESCRIPTION OF THE DRAWINGS

FIG. 4 is a circuit block diagram schematically showing the configuration of the magnetic disk device of FIG. 1.

DESCRIPTION OF THE PREFERRED EMBODIMENTS

A description will now be given of embodiments of the present invention with reference to the drawings.

Figure 1:
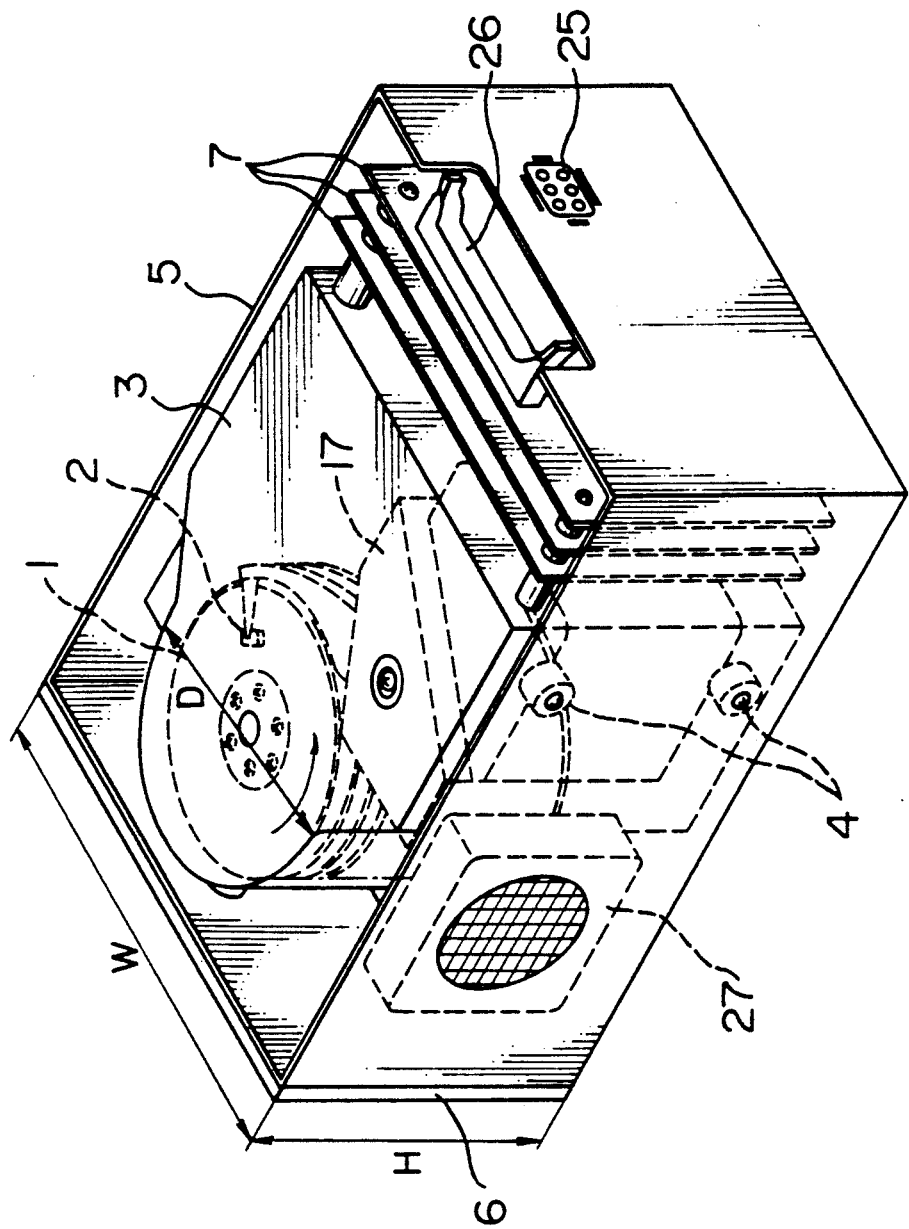
FIG. 1 is a perspective view schematically illustrating an embodiment of a magnetic disk device according to the present invention.

The magnetic disk device of FIG. 1 includes a magnetic disk 1, a magnetic head 2, a head disk assembly (HDA) 3 housing an actuator having a voice coil motor moving the magnetic head 2 in a substantially radial direction of the magnetic disk 1, a frame 5 for supporting the HDA 3 via shock absorber mounts 4, a smoothly planed board 6 disposed in the frame 5, a peripheral circuit assembly 7 having a read/write circuit used to enable the magnetic head 2 to record and reproduce information on the magnetic disk and other circuitry, and a fan 27 to supply external air to the periphery of the HDA 3 so as to cool the HDA 3. In addition, the frame 5 has holes for screws (not shown) to mount the magnetic disk system on the housing of the system. An outer dimension D (representing the dimension of the outer diameter of the disk 1) of the outer diameter of the HDA 3 is approximately 60% of the dimension of the width W of the magnetic disk device, which provides a sufficient stroke for each of the shock absorber mounts 4 disposed between the frame 5 and the HDA 3.

Figure 2:
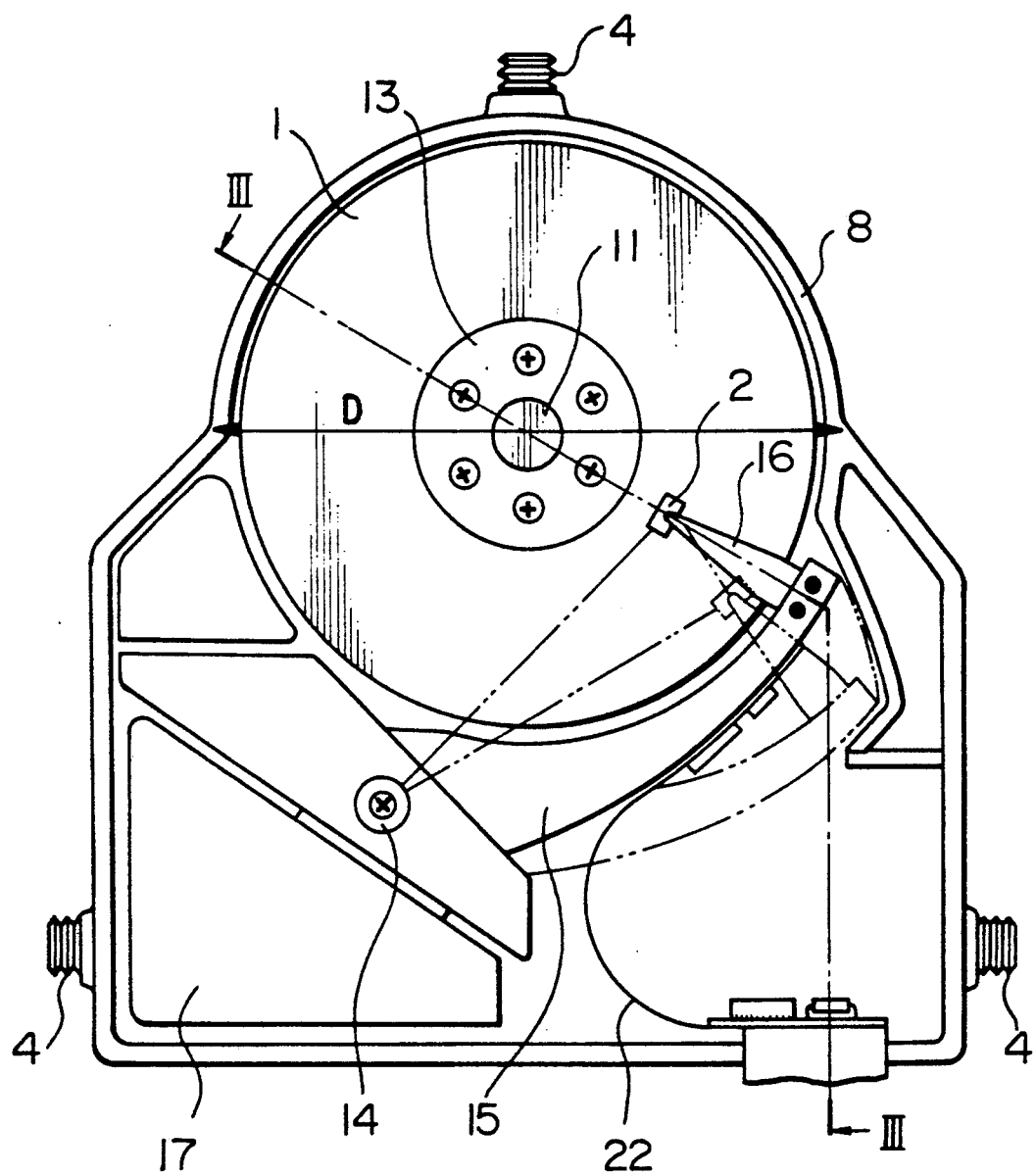
FIG. 2 is a plan view of the magnetic disk device of FIG. 1.
Figure 3:
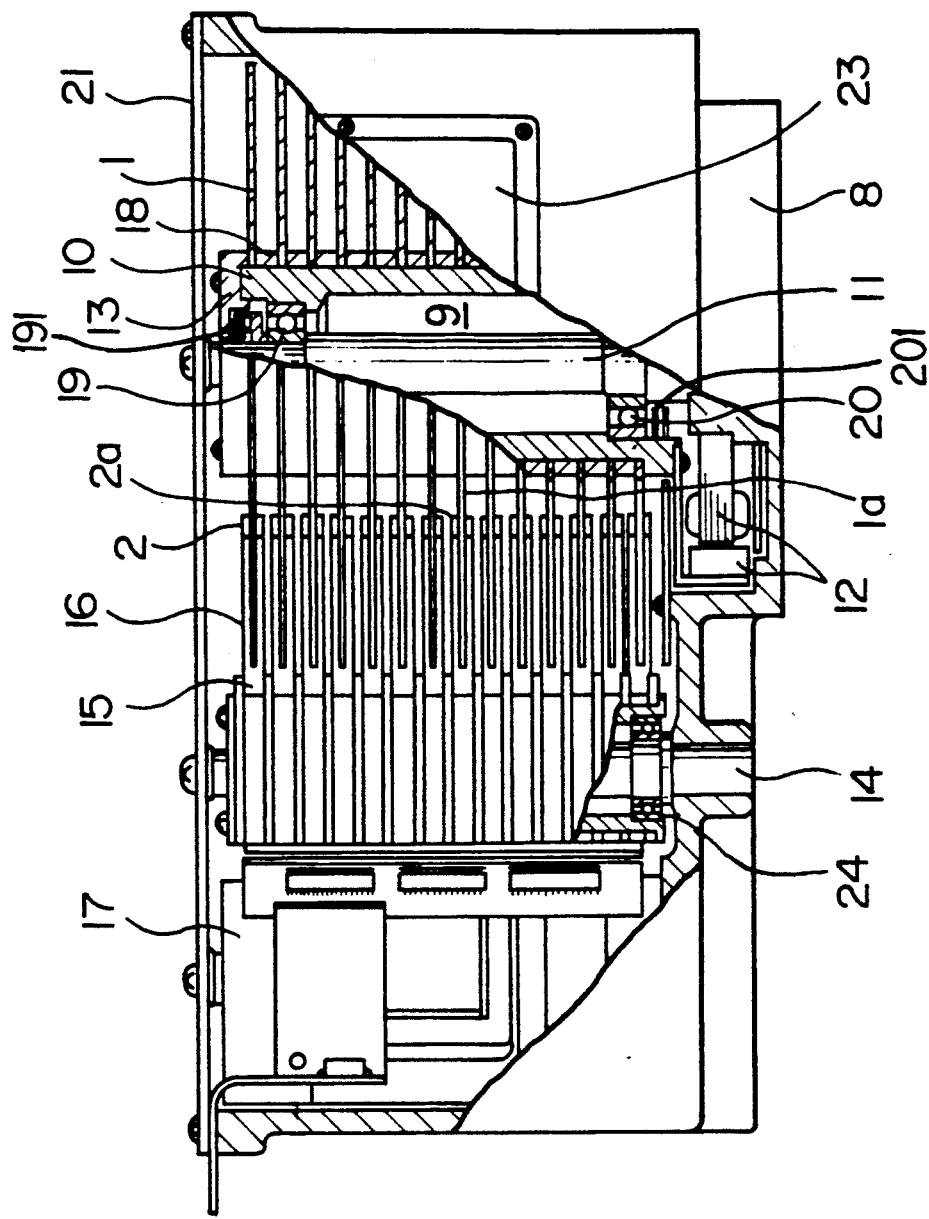
FIG. 3 is a cross-sectional view of the magnetic disk device along a line III—III of FIG. 2.

FIGS. 2-3 show the internal configuration of the HDA 3. The HDA 3 comprises a housing 8 and the following main parts integrated therein. The main parts include a rotating disk 1 and a spindle 9 supporting the disk 1. The spindle 9 comprises a hub 10, a shaft 11, and bearings 19-20. At an end of the shaft 11, there is disposed a spindle motor 12 to drive the spindle 9, whereas the disk 1 is mounted on the hub 10 by means of a clamp 13. Furthermore, the magnetic head 2 is fixed via a gimbal 16 on an arm 15 rotatable about a pivot 14 and is movable in the radial direction of the disk 1 by means of a voice coil motor (VCM) 17 integral with the arm 15. Disks 1 are vertically arranged via a spacer 18 therebetween. For each disk 1, a magnetic head 2 is located over one or both of the surfaces thereof, namely, a sequential recording and reproducing operations of information can be achieved through a plurality of magnetic heads 2 located at the same radial position. Note that, as clearly shown in FIG. 1, the peripheral circuit assembly 7 is located outside the enclosure or the housing 8 of the HDA 3, between one of the end faces of the frame 5 and the housing 8.

As compared with the prior-art magnetic disk device, the magnetic disk device of the present embodiment has an increased number of disks 1 arranged in the vertical direction, at least 10 disks, preferably 14 disks. Consequently, in order to reduce the displacement of the spindle 9 associated with the rotation of the disks 1, the bearings 19-20 are disposed on the ends of the hub 10, furthermore, the ends of the shaft 11 are fixed on the housing 8 of the HDA 3 and a cover 21. The shaft 11 fixed on the cover 21 is solid in the radial direction and is to be elastically linked in the axial direction. The bearings 19-20 supporting the shaft 11 have the different diameters, and the rotating periods of the ball and retainers of the bearings 19 and 20 are different from each other, which leads to an effect to minimize the vibration (vibration of the hub 10 in this case). In addition, seals 20-21 are disposed on both sides of the hub 10 of the bearings 19-20, which prevents the mist of the lubricant applied to the bearings 19-20 from diffusing into the HDA 3.

Furthermore, in FIG. 3 showing a cross-sectional view along a line III—III of FIG. 2, the rotating hub 10 and the arm 15 are fixed onto outer rings of the bearings 19-20 and 24, respectively; whereas inner rings of the bearings 19-20 and 24 are fixedly retained onto shafts 11 and 14, respectively; moreover, the shafts 11 and 14 are fixed on the housing 8. However, these shafts 11 and 14 may be retained via respective housing blocks (not shown) on the housing 8.

The arm 15 on which the magnetic heads 2 are mounted is movable about the shaft 14, and on an end of the arm 15, coil of the voice coil motor 17 is mounted. The voice coil motor 17 including a magnet is located in the housing 8 having a size greater than the diameter of the disk 1 and hence the size of the voice coil motor 17 can be increased, thereby enabling the magnetic heads 2 to be positioned at a high speed. On a side of the housing 8 having a size greater than the diameter of the disk 1, there is disposed a flexible printed circuit board 22 including a portion of the recording and reproducing circuit to enable the magnetic heads 2 to record and reproduce information, and the printed circuit board 22 is linked to the peripheral circuit assembly 7 of FIG. 1.

Since the flexible printed circuit board 22 electrically connected to the magnetic heads 2 for communicating information with an external device is housed in an expanded portion of the housing 8, the curvature of the circuit board 22 can be increased and hence the life thereof with respect to the bending can be elongated and minimization of the load on the voice coil motor 17 becomes possible.

Each arm 15 has a surface opposing to the disk 1 and the surface is kept located at a position where the surface does not disturb the disk 1 even when the magnetic heads 2 are moved to the inner-most track of the disk 1, and the adjacent opposing surfaces of the arms 15 with respect to the respective disks 1 are arranged with a very short distance therebetween so as to cover the outer ends of the disks. This enables a fluid such as air or helium gas existing in the peripheral environment of the disks 1 rotating at a high speed to flow along the disks 1 without causing an eddy of the fluid in the housing 8, which minimizes the ineffective load imposed on the spindle motor 12.

In the configuration of FIG. 3, a servo disk 1a on which positional information has been beforehand written is disposed at a substantially central position of the disks 1 vertically arranged. Correspondingly to the servo disk 1a, a servo head 2a disposed to read positional information used to position the magnetic heads 2. Incidentally, a dedicated magnetic head insertion window 23 is disposed in a side wall of the housing 8 to beforehand record positional information on the servo disk 1a. The dedicated magnetic head insertion window 23 is so arranged to insert the magnetic head which writes a servo track as a reference position of the heads 2.

Since the servo disk 1a and the servo head 2a are located at the central position of the disks 1, the phenomenon of the off-track caused by an inclination of the spindle due to thermal stress can be equally distributed to the upper and lower portions of the . disks 1; as a result, a magnetic disk device having a high reliability can be provided.

Furthermore, as shown in FIG. 1, a cooling fan 27 to cool the HDA 3 is mounted on the frame 5, thereby preventing the temperature of the HDA 3 from being increased.

FIG. 4 is a schematic block diagram showing a circuit configuration according to the present invention. The circuit configuration of FIG. 4 is connected to external devices by means of a system drive power connector 25 and an interface connector 26 in which the SMD Interface is used to communicate signals for the interface.

The circuits of this diagram excepting a data enclosure 420 are mounted in the peripheral circuit assembly 7 of FIG. 1.

Description will now be given of the circuit configuration of FIG. 4. The circuit system is mainly classified into an upper portion including a head positioning system, a lower portion comprising a data recording and reproducing system, and a spindle motor drive system.

The head positioning system includes a command register 41 to which a command transferred from a controller (not shown) at an upper level is set and a head address register 42 to which a head address is set. An access controller 43 interprets the commands and the head address so as to send control signals to the circuits which will be described later.

If the command stored in the command register 41 is a read/write command, a voice coil motor drive circuit 45 drives the voice coil motor 17 (FIG. 3) depending on the head address stored in the head address register 42. A servo signal detecting circuit 44 detects a position of the heads 2 based on servo data read by the servo head 2a from the servo disk 1a.

On the other hand, in the data recording and reproducing system, a modulation/demodulation circuit 47 effects modulation/demodulation on data transferred from a device at an upper level or read from the disks 1, for example, from the NRZ modulation code into the 2-7RLLC modulation code (Run Length Limited Code 2-7). Write data and read data are amplified by a write amplifier 48 and a read amplifier 49, respectively. Write and read operations of the data are achieved through an analysis effected by a read/write controller 46 for the command loaded in the command register 41.

The spindle motor drive system includes a motor drive circuit 410 to drive the rotation of the spindle motor 12. The drive circuit 410 rotates the spindle motor 12 at a rotational speed of approximately 5000 rpm and is so controlled to achieve a contact start/stop operation of the magnetic head 2.

According to the embodiment of the present invention, in a magnetic disk device of an 8-inch size, a disk having a diameter of 5.25 inches and a moment of inertia which is about 15% less than the conventional disk for the weight thereof about 50% less than that of the conventional disk can be rotated at a rotational speed about 30% greater than the rotational speed developed by the corresponding disk and hence the average latency time can be reduced by about 30%; furthermore, as compared with the size of the device, a relatively large-sized voice coil motor is available. Since the distance of the movement is minimized by about 50%, the average access time is reduced by about 60%, namely, an access time of about 12 ms is possible. Moreover, since about 14 disks can be vertically arranged, a large-capacity magnetic disk device having a storage capacity of about 700 megabytes can be provided.

While the present invention has been described with reference to the particular embodiments, it is not restricted by those embodiments but only by the appended claims. It is to be appreciated that those skilled in the art can change and modify the embodiments without departing from the scope and spirit of the invention.

We claim:

1. A structure for an information recording and reproducing apparatus adapted for increased storage capacity and an increased operating speed by placing a relatively larger number of relatively smaller magnetic disks each having a relatively smaller mass and a relatively smaller recording and reproducing surface in a box-like frame for a relatively larger magnetic disc, comprising:
   a plurality of coaxially arranged 5.25 inch magnetic disks;
   a corresponding number of magnetic heads, one magnetic head for recording and reproducing information on each of said magnetic disks;
   means for positioning said magnetic heads at positions with respect to said magnetic disks for recording and reproduction of information on said magnetic disks;
   means for rotating said magnetic disks;
   a circuit assembly for controlling the operation of recording and reproducing information to and from said magnetic disks;
   an enclosure for housing said magnetic heads, said magnetic disks, said positioning means, and said rotating means; and
   a box-like frame for holding and mounting said enclosure, said frame having opposing inner end faces of a width about 8 inches, sized for capable of accommodating 8-inch disks and opposing inner side faces joined with said end faces, said side surfaces having a length greater than the length of said end faces,
   wherein said circuit assembly is disposed outside said enclosure and disposed between one of said end faces of said frame and said enclosure, said end faces and said side faces of said frame being generally perpendicular to a plane of said disks, and
   wherein said positioning means is capable of positioning each said magnetic head within an average time of about 12 millisecond, and said rotating means is capable of rotating said magnetic disks at about 5,000 rpm.

2. A structure according to claim 1, wherein the number of magnetic disks is at least 10.

3. A structure according to claim 1, wherein said enclosure is disposed in said frame so that said magnetic disks are closer to one of said end faces of said frame, said circuit assembly is disposed between the end face of said frame which is farther from said magnetic disks and said enclosure, said circuit assembly including a circuit board unit arranged substantially perpendicular to a plane parallel with said magnetic disks.

4. A structure according to claim 3, wherein said circuit board unit is capable of receiving and delivering signals through an interface-connector provided on said end face of said frame which is farther from said magnetic disks.

5. A structure for an information recording and reproducing apparatus adapted for increased storage capacity and an increased operating speed by placing a relatively larger number of relatively smaller magnetic disks which has a relatively smaller mass and recording and reproducing surface in a box-like frame intended for a relatively larger magnetic disc, comprising:
   a plurality of 5.25 inch magnetic disks;
   a corresponding number of magnetic heads for recording and reproducing information to and from said magnetic disks;
   positioning means for moving each of said magnetic heads radially of the respective magnetic disk to position each magnetic head at a desired position within an average time of about 12 msec;
   means for rotating said magnetic disks at a speed of about 5,000 rpm;

an enclosure for enclosing said magnetic heads, said magnetic disks, said positioning means and said rotating means;

a box-like frame for holding and mounting said enclosure, said frame having opposing inner end faces and opposing inner side faces joined with said end faces, said end faces having a width of about 8 inches;

shock absorbing means disposed between said enclosure and said frame for absorbing shock exerted to said frame; and a circuit assembly disposed outside said enclosure and disposed between one of said end faces of said frame and said enclosure for controlling the operation of recording and reproducing information on said magnetic disks.

* * * * *